(12) United States Patent
Kim et al.

(10) Patent No.: US 12,450,694 B2
(45) Date of Patent: Oct. 21, 2025

(54) LOW-LIGHT IMAGE IMPROVEMENT APPARATUS AND METHOD

(71) Applicant: KOREA UNIVERSITY RESEARCH AND BUSINESS FOUNDATION, Seoul (KR)

(72) Inventors: Jong Ok Kim, Seoul (KR); Tae Hyun Kim, Seoul (KR); Jeong Hyeok Park, Goyang-si (KR)

(73) Assignee: Korea University Research and Business Foundation, Seoul (KR)

( * ) Notice: Subject to any disclaimer, the term of this patent is extended or adjusted under 35 U.S.C. 154(b) by 339 days.

(21) Appl. No.: 18/221,989

(22) Filed: Jul. 14, 2023

(65) Prior Publication Data

US 2024/0161243 A1   May 16, 2024

(30) Foreign Application Priority Data

Nov. 15, 2022   (KR) .................. 10-2022-0152133

(51) Int. Cl.
*G06T 5/50*   (2006.01)

(52) U.S. Cl.
CPC ...... *G06T 5/50* (2013.01); *G06T 2207/10024* (2013.01); *G06T 2207/10048* (2013.01); (Continued)

(58) Field of Classification Search
CPC ............. G06T 5/50; G06T 2207/10024; G06T 2207/10048; G06T 2207/10152; G06T 2207/20081; G06T 2207/20084; G06T 2207/20221; G06T 5/60; G06T 5/94; G06N 3/0464; G06V 10/14; G06V 10/40
See application file for complete search history.

(56) References Cited

U.S. PATENT DOCUMENTS

2022/0261593 A1* 8/2022 Yu ..................... G06N 3/088
2023/0298330 A1* 9/2023 Chan ................. G06V 10/776
                                                       382/159

OTHER PUBLICATIONS

Wei, Chen, et al., "Deep Retinex Decomposition for Low-Light Enhancement", arXiv:1808.04560v1, Aug. 14, 2018, (12 Pages in English).

(Continued)

*Primary Examiner* — Phuoc Tran
(74) *Attorney, Agent, or Firm* — NSIP Law

(57) ABSTRACT

Disclosed are a low-light image improvement apparatus and method. The low-light image improvement apparatus includes: an image component decomposition network module that analyzes a light image, a low-light image, and a mid-light image to decompose reflectance and illumination, respectively, wherein the mid-light image is generated using the light image and the low-light image; and a component improvement network module configured to include a mid-teacher network model that extracts a first feature map with improved reflectance and illumination of the mid-light image using the reflectance and illumination of the light image and a student network module that distills the extracted first feature map and then extracts a second feature map for the reflectance and illumination of the low-light image based on the distilled first feature map and acquires an image with improved light by reflecting a structural component of a multi-band near-infrared image in the second feature map.

6 Claims, 6 Drawing Sheets

(52) U.S. Cl.
CPC ............... *G06T 2207/10152* (2013.01); *G06T 2207/20081* (2013.01); *G06T 2207/20084* (2013.01); *G06T 2207/20221* (2013.01)

(56) References Cited

OTHER PUBLICATIONS

Zhang, Yonghua, et al., "Beyond Brightening Low-Light Images", International Journal of Computer Vision, vol. 129, Jan. 6, 2021, (25 Pages in English).

Wang, Xixi, et al., "MutualFormer: Multi-Modality Representation Learning via Mutual Transformer", Journal of Latex Class Files, vol. 14, No. 8, arXiv:2112.01177v2, Dec. 21, 2021 (12 Pages in English).

Park, Tae-Sung, et al., "Multi-Band Near-Infrared Image Conversion Using Knowledge Distillation Learning", 2022 Electronic Engineering Society of Korea Summer Conference Proceedings, Jun. 29-Jul. 2, 2022, (2 Pages in Korean).

Park, Jeong-Hyeok, et al., "Dual-Teacher Distillation for Low-Light Image Enhancement", 2022 Asia-Pacific Signal and Information Processing Association Annual Summit and Conference (APSIPA ASC), Nov. 7-10, 2022, (5 Pages in English).

Korean Office Action Issued on Dec. 12, 2023, in Counterpart Korean Patent Application No. 10-2022-0152133 (7 Pages in Korean).

\* cited by examiner

LOW-LIGHT IMAGE IMPROVEMENT APPARATUS AND METHOD

CROSS-REFERENCE TO RELATED APPLICATION

This application claims under 35 U.S.C. § 119(a) the benefit of Korean Patent Application No. 10-2022-0152133 filed on Nov. 15, 2022, the disclosure of which is incorporated herein by reference in its entirety.

BACKGROUND

(a) Technical Field

The present invention relates to a low-light image improvement apparatus and method.

(b) Background Art

It is necessary for a subsequent image processing process to preserve a structure of a low-light image to a normal light image level and improve brightness. Researches based on the Retinex theory have been conducted to improve the low-light image. According to the Retinex theory, scenes perceived by humans are composed of illumination and reflectance, and the brightness of the image may be improved by adjusting the components.

The conventional low-light image improvement method using the Retinex theory adopts a model-based method and a deep learning method, respectively. However, reconstructing a low-light RGB image with insufficient color information to a normal light RGB image causes problems such as noise and color information loss during the improvement process, and therefore, additional analysis and improvement are required.

SUMMARY OF THE INVENTION

The present invention is to provide a low-light image improvement apparatus and method.

In addition, the present invention is to provide a low-light image improvement apparatus and method capable of reconstructing color information and detailed structural information of an image like a normal light image by using a correlation between a near-infrared multi-band image and a low-light RGB image.

According to an aspect of the present invention, there is provided a low-light image improvement apparatus.

According to an embodiment of the present invention, there may be provided a low-light image improvement apparatus, including an image component decomposition network module that analyzes a light image, a low-light image, and a mid-light image to decompose reflectance and illumination, respectively, wherein the mid-light image is generated using the light image and the low-light image, and a component improvement network module configured to include a mid-teacher network model that extracts a first feature map with improved reflectance and illumination of the mid-light image using the reflectance and illumination of the light image and a student network module that distills the extracted first feature map and then extracts a second feature map for the reflectance and illumination of the low-light image based on the distilled first feature map and acquires an image with improved light by reflecting a structural component of a multi-band near-infrared image in the second feature map.

The student network model may include: a first encoder configured to distill a first feature map and extract a second feature map for reflectance and illumination of the low-light image based on the distilled first feature map; a second encoder configured to receive the multi-band near-infrared image and extract a third feature map; a cross-attention transformer unit configured to fuse the third feature map in the second feature map to reflect a structural component of the multi-band near-infrared image; a first decoder and a second decoder configured to reconstruct the reflectance and illumination using the fused feature map, respectively; and a synthesizing unit configured to generate the image with improved light by multiplying the reflectance and the illumination reconstructed by the first decoder and the second decoder.

The cross-attention transformer unit may fuse a cross-attention map of a self-attention map for the second feature map and the third feature map.

The image component decomposition network module may have a separated convolutional neural network model, and the separated neural network models may share weights with each other.

According to another aspect of the present invention, there is provided a low-light image improvement method.

According to an embodiment of the present invention, there may be a low-light image improvement method, including: applying a light image, a low-light image, and a mid-light image to an image component decomposition network to decompose reflectance and illumination, respectively, wherein the mid-light image is generated using the light image and the low-light image; training the mid-teacher network model to improve the reflectance and illumination of the mid-light image using the reflectance and illumination of the light image, and then knowledge distilling an output of an encoder of the mid-teacher network model into a student network model; and inputting the reflectance and illumination of the low-light image to the student network model, extracting a feature map for the low-light image based on the distilled knowledge, and reflecting a structural feature of a multi-band near-infrared image in the feature map for the low-light image to generate an image with improved light.

The generating of the image with improved light may include: extracting a feature map for the multi-band near-infrared image; generating a fused feature map by fusing the feature map of the multi-band near-infrared image with the low-light image feature map based on a cross-attention algorithm to reflect a structural component of the multi-band near-infrared image; reconstructing reflectance with improved light and illumination with improved light using the fused feature map; and generating an image with improved light by multiplying the reflectance with improved light and the illumination with improved light.

According to an embodiment of the present invention, by providing a low-light image improvement method and apparatus, it is possible to reconstruct color information and detailed structural information of an image like a normal light image by using a correlation between a near-infrared multi-band image and a low-light RGB image.

DETAILED DESCRIPTION

In the present specification, singular forms include plural forms unless the context clearly indicates otherwise. In the specification, it is to be noted that the terms "comprising" or "including," and the like, are not be construed as necessarily including several components or several steps described in the specification and some of the above components or steps may not be included or additional components or steps are to be construed as being further included. In addition, terms " . . . unit," "module," and the like, described in the specification refer to a processing unit of at least one function or operation and may be implemented by hardware or software or a combination of hardware and software.

Hereinafter, exemplary embodiments of the present invention will be described in detail with reference to the accompanying drawings.

Figure 1:
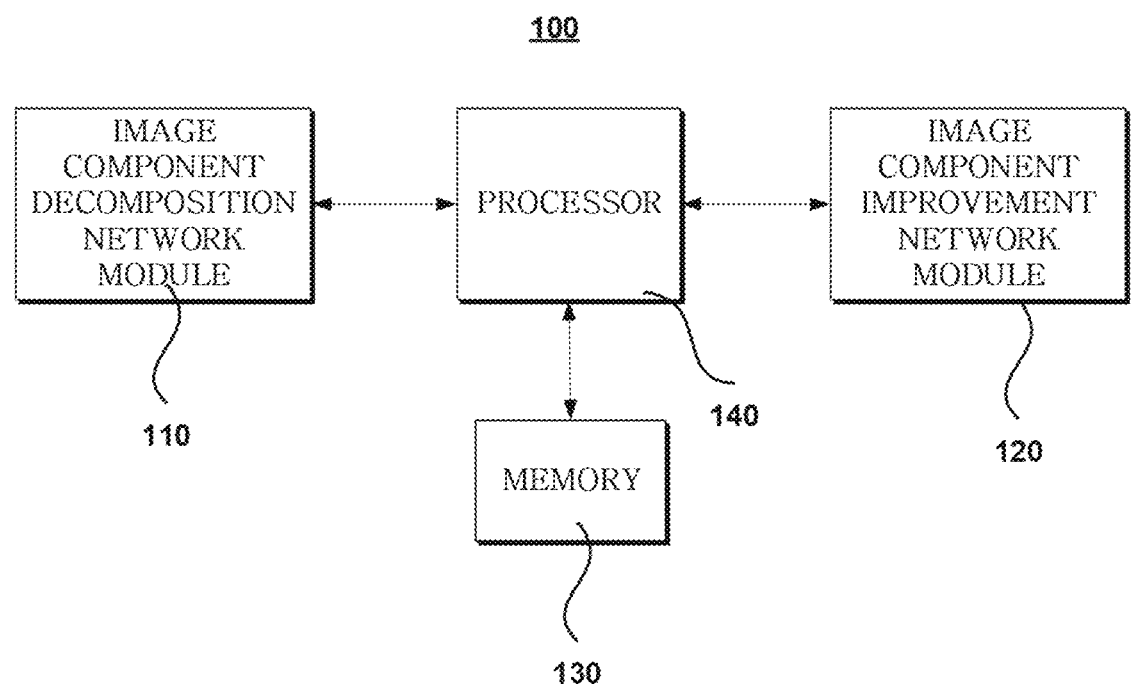
FIG. 1 is a diagram schematically illustrating a configuration of a low-light image improvement apparatus according to an embodiment of the present invention.
Figure 2:
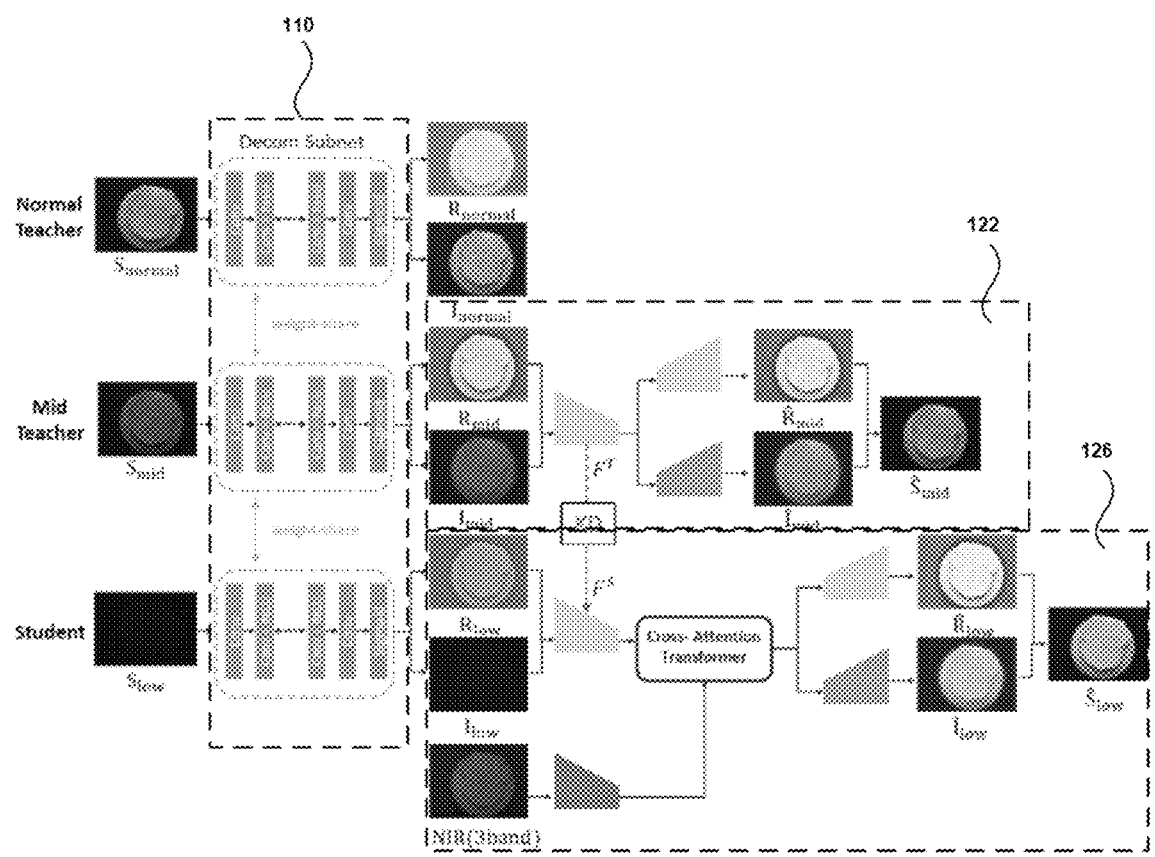
FIG. 2 is a diagram illustrating a network model for low-light image improvement according to an embodiment of the present invention.
Figure 3:
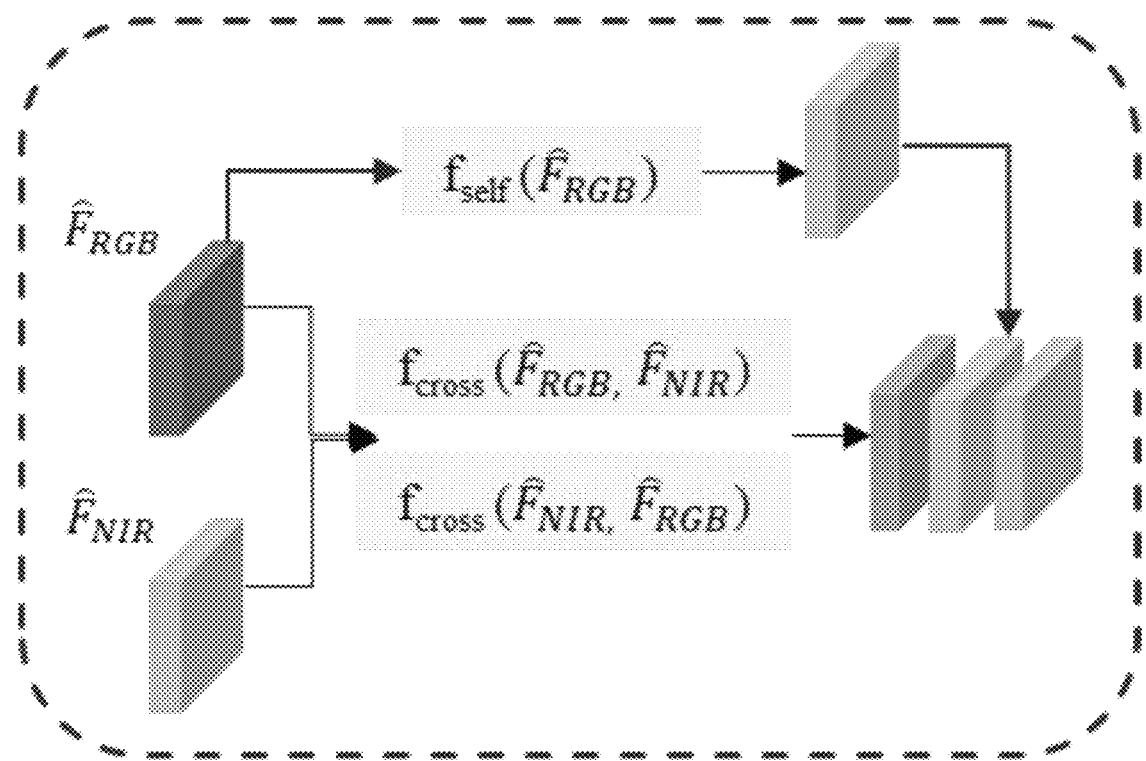
FIG. 3 is a diagram for describing a cross-attention transformer according to an embodiment of the present invention.

FIG. 1 is a diagram schematically illustrating a configuration of a low-light image improvement apparatus according to an embodiment of the present invention, FIG. 2 is a diagram illustrating a network model for low-light image improvement according to an embodiment of the present invention, and FIG. 3 is a diagram for describing a cross-attention transformer according to an embodiment of the present invention.

Referring to FIG. 1, a low-light image improvement apparatus 100 according to an embodiment of the present invention includes an image component decomposition network module 110, an image component improvement network module 120, a memory 130, and a processor 140.

As illustrated in FIG. 2, the image component decomposition network module 110 is composed of a separated convolutional neural network. The convolutional neural network may include a layer for extracting an initial feature map, a layer for acquiring necessary features from the extracted feature map, and a layer for finally reconstructing the acquired feature map.

Accordingly, the image component decomposition network module 110 receives a normal light image, a low-light image, and a mid-light image and decomposes these images into reflectance and illumination, respectively. Here, the mid-light image may be generated using the normal light image and the low-light image. That is, the mid-light image may be generated by averaging the normal light image and the low-light image.

An image may be composed of illumination and reflectance, and may be decomposed into the illumination and reflectance, respectively, by applying the Retinex algorithm. Since this is obvious to those skilled in the art, a detailed description thereof will be omitted.

According to an embodiment of the present invention, the normal light image, the low-light image, and the mid-light image, respectively, may be input to each decomposition neural network and trained while sharing weights with each other.

The normal light image can be decomposed into reflectance $R_{normal}$ and illumination $I_{normal}$ by applying it to the corresponding decomposition neural network. In addition, the mid-light image may be decomposed into reflectance $R_{mid}$ and illumination $I_{mid}$, respectively, by applying it to the corresponding decomposition neural network. In addition, the low-light image may be decomposed into reflectance $R_{low}$ and illumination $I_{low}$, respectively, by applying it to the corresponding decomposition neural network. Each of the decomposition neural networks to which these normal light image, mid-light image, and low-light image are respectively input may share weights with each other.

The image component improvement network module 120 includes a mid-teacher network model 122 and a student network model 126.

The mid-teacher network model 122 may extract a feature map $F^T$ by improving the reflectance $R_{mid}$ and illumination $I_{mid}$ of the mid-light image using the reflectance $R_{normal}$ and illumination $I_{normal}$ of the normal light image, and knowledge-distill the corresponding feature map $F^T$ into the student network model 126.

As illustrated in FIG. 2, the mid-teacher network model 122 includes an encoder and two decoders.

The encoder of the mid-teacher network model 122 extracts the feature map by receiving the reflectance $R_{normal}$ and illumination $I_{normal}$ of the normal light image, and the reflectance $R_{mid}$ and illumination $I_{mid}$ of the mid-light image. That is, the encoder of the mid-teacher network model 122 may extract the feature map $F^T$ with the improved reflectance $R_{mid}$ and illumination $I_{mid}$ of the mid-light image using the reflectance $R_{normal}$ and illumination $I_{normal}$ of the normal light image.

Subsequently, each decoder of the mid-teacher network model 122 may reconstruct mid-reflectance $\hat{R}_{mid}$ and mid-illumination $\hat{I}_{mid}$, respectively, using the feature map $F^T$, fuse the reconstructed mid-reflectance $\hat{R}_{mid}$ and mid-illumination $\hat{I}_{mid}$, and then reconstruct mid-light image $\hat{s}_{mid}$.

In this way, the encoder of the mid-teacher network model 122 performs training to improve each component (reflectance $R_{mid}$ and illumination $I_{mid}$) of the mid-light image using the reflectance $R_{normal}$ and illumination $I_{normal}$ of the normal light image, and then distills the corresponding knowledge into the student network model 126. That is, the mid-teacher network model 122 may distill the feature map $F^T$ extracted from the encoder into the student network model 126.

The mid-teacher network model 122 may be pre-trained.

The student network model 126 is a means for outputting an image with improved light by distilling knowledge from the mid-teacher network model 122 and improving the low-light image using the distilled knowledge. When improving the low-light image, the student network model 126 may generate an image with improved light by additionally reflecting the structural components of the multi-band near-infrared image, rather than using only the knowledge distilled from the mid-teacher network model 122.

This will be described in more detail below.

The student network model 126 includes two encoders (first encoder and second encoder) and two decoders (first decoder and second decoder) and a cross-attention transformer unit.

The first encoder distills the knowledge of the encoder of the mid-teacher network model 122. That is, the feature map $F^T$ of the encoder of the mid-teacher network model may be distilled into the first encoder of the student network model 126.

Accordingly, the first encoder may receive four channels in which the reflectance $R_{low}$ and illumination $I_{low}$ of the low-light image are combined as channel axes, and extract a feature map $F^S$ of the low-light image based on the distilled feature map $F^T$. By distilling the feature map $F^T$ of the encoder of the teacher network model that went into the first encoder, the output $F^S$ of the first encoder may be trained to be similar to $F^T$.

In addition, the second encoder may receive a multi-band near-infrared image and extract a feature map. Here, the multi-band near-infrared image is an image having a maximum wavelength of 785 nm, 850 nm, and 940 nm, and may include structural features.

Each feature map output from the first encoder and the second encoder may be delivered to the cross-attention transformer unit, and fused by the cross-attention transformer unit to output the fused feature map.

By inputting the feature map corresponding to the multi-band near-infrared image to the cross-attention transformer unit and fusing the feature map with the feature map for the low-light image, the structural features included in the multi-band near-infrared image may be reflected in the low-light image and supplemented.

FIG. 3 illustrates the operation process of the cross-attention transformer unit.

As illustrated in FIG. 3, the cross-attention transformer unit may generate a self-attention map for the feature map $F^S$, which is the output of the first encoder, and generate the cross-attention map with the feature map corresponding to the multi-band near-infrared image, respectively, and then fuse the generated self-attention map and cross-attention map to generate the fused feature map.

This may be as shown in Equation 1.

$$f_{CAT}(\hat{F}_{NIR}, \hat{F}_{RGB}) = f_{self}(\hat{F}_{RGB}) + f_{cross}(\hat{F}_{RGB}, \hat{F}_{NIR}) + f_{cross}(\hat{F}_{NIR}, \hat{F}_{RGB})$$  [Equation 1]

Here, $f_{self}(\hat{F}_{RGB}) = Q_R K_R V_R$,
$f_{cross}(\hat{F}_{RGB}, \hat{F}_{NIR}) = Q_R K_N V_N$ and,
$f_{cross}(\hat{F}_{NIR}, \hat{F}_{RGB}) = Q_N K_R V_R$. R denotes $R^S$, N denotes a feature map corresponding to a multi-band near-infrared image, and Q, K, and V denote queries, keys, and values, respectively.

That is, the cross attention is an attention mechanism that mixes two different embedding sequences in a transformer. The embedding sequence is the result of adding patch embedding and positional encoding, and may extract queries, keys, and values. Unlike the self-attention map in which the query, key, and value are input as one sequence, the two sequences may be of different data types, and one sequence serves as the query input, and the other sequences produces key and value inputs. Through the cross attention, information in different data types may be obtained by appropriately mixing keys and values in the query.

Referring back to FIG. 2, the fused feature map, which is the output of the cross-attention transformer unit, is input to the first decoder and the second decoder, respectively, and the first decoder may reconstruct reflectance $\hat{R}_{low}$ with improved light using the fused feature map and the second decoder may reconstruct illumination $\hat{I}_{low}$ with improved light using the fused feature map.

Next, a final image with improved light may be generated by multiplying the reflectance $\hat{R}_{low}$ with improved light and the illumination $\hat{I}_{low}$ with improved light, which are the outputs of the first decoder and the second decoder.

The operations and functions of the image component decomposition network module 110 and the image component improvement network module 120 have been described, and these loss functions will be briefly described.

The loss function is composed of an image reconstruction loss function, a structure loss function, a VGG loss function, a reflectance loss function, and a knowledge distillation loss function.

The image reconstruction loss function is applied to the image component decomposition network module and the image component improvement network module, respectively, and the loss function applied to the image component decomposition network module is as shown in Equation 2. The loss function applied to the image component improvement network module is as shown in Equation 3.

$$L_{recom(decom)} = \sum_{i \in \{normal, mid, low\}} \|R_i \circ I_i - S_i\|_1$$  [Equation 2]

Here, $R_i$ denotes the reflectance, $I_i$ denotes the illumination, and $S_i$ denotes the image.

$$L_{recon(tea)} = \|\hat{R}_{mid} \circ \hat{I}_{mid} - S_{normal}\|_1$$

$$L_{recom(stu)} = \|\hat{R}_{low} \circ \hat{I}_{low} - S_{normal}\|_1$$  [Equation 3]

Here, $\hat{R}_{mid}$ denotes the reflectance of the mid-light image, $\hat{I}_{mid}$ denotes the illumination of the mid-light image, $S_{normal}$ denotes the normal light image, $\hat{R}_{low}$ denotes the reflectance of the low-light image, $\hat{I}_{low}$ and denotes the illumination of the low-light image.

The structure loss function is applied to the image component decomposition network module and the image component improvement network module, respectively, and the loss function applied to the image component decomposition network module is as shown in Equation 4. The loss function applied to the image component improvement network module is as shown in Equation 5.

$$L_{str(decom)} = \sum_{i \in \{normal, mid, low\}} \|\nabla I_i \circ \exp(-\lambda \nabla R_i)\|_1$$  [Equation 4]

$$L_{str(tea)} = \|\nabla \hat{I}_{mid} \circ \exp(-\lambda \nabla \hat{R}_{mid})\|_1$$  [Equation 5]

$$L_{str(stu)} = \|\nabla \hat{I}_{low} \circ \exp(-\lambda \nabla \hat{R}_{low})\|_1$$

In addition, the VGG loss function is applied to the mid-teacher network model 122 and the student network model 126 of the image component improvement network module 120, and is shown in Equation 6.

$$L_{VGG(tea)} = \sum_{layer} \|VGG(\hat{S}_{mid}) - VGG(S_{normal})\|_{layer}$$  [Equation 6]

$$L_{VGG(stu)} = \sum_{layer} \|VGG(\hat{S}_{low}) - VGG(S_{normal})\|_{layer}$$

The reflectance loss function is applied to the image component decomposition network module and the image component improvement network module, respectively, and is as shown in Equation 7.

$$L_{ir(decom)} = \sum_{i \in \{mid, low\}, j \in \{normal, mid\}} \|R_i - R_j\|_1$$  [Equation 7]

$$L_{ir(tea)} = \|\hat{R}_{mid} - R_{normal}\|_1$$

$$L_{ir(stu)} = \|\hat{R}_{low} - R_{normal}\|_1$$

The knowledge distillation loss function is applied between the mid-teacher network model 122 and the student network model 126 of the image component improvement network module 120, and the feature map for the mid-teacher network model 122 applies a (meta network: serves to adapt the mid-light domain to the low-light domain) and then applies an MSE loss function.

This is shown as in Equation 8.

$$L_{fd} = \sum_{i \in \{layer\}} \|F_i^S - \alpha(F_i^T)\|_2 \quad \text{[Equation 8]}$$

The loss function of the image component decomposition network module is composed of three sub-loss functions as shown in Equation 9.

$$L_{decom} = L_{recon(decom)} + L_{str(decom)} + L_{ir(decom)} \quad \text{[Equation 9]}$$

$L_{decom}$ indicates the loss function for the decomposition network, $L_{tea}$ and $L_{stu}$ are the loss functions for the mid-teacher network model 122 and the student network model 126 of the image component improvement network module 120.

$$L_{tea} = L_{recon(tea)} + L_{str(tea)} + L_{VGG(tea)} + L_{ir(tea)}$$

$$L_{stu} = L_{recon(stu)} + L_{str(stu)} + L_{VGG(stu)} + L_{ir(stu)} + L_{fd} \quad \text{[Equation 10]}$$

Therefore, the total loss function is composed of the following three loss functions.

$$L_{total} = L_{decom} + L_{tea} + L_{stu} \quad \text{[Equation 11]}$$

The memory 130 stores program codes for performing a low-light image improvement method using double knowledge distillation learning and cross attention based on a multi-band near-infrared image according to an embodiment of the present invention.

The processor 140 is a means for controlling internal components (e.g., image component decomposition network module 110, image component improvement network module 120, memory 130, etc.) of the low-light image improvement apparatus 100 according to an embodiment of the present invention.

Figure 4:
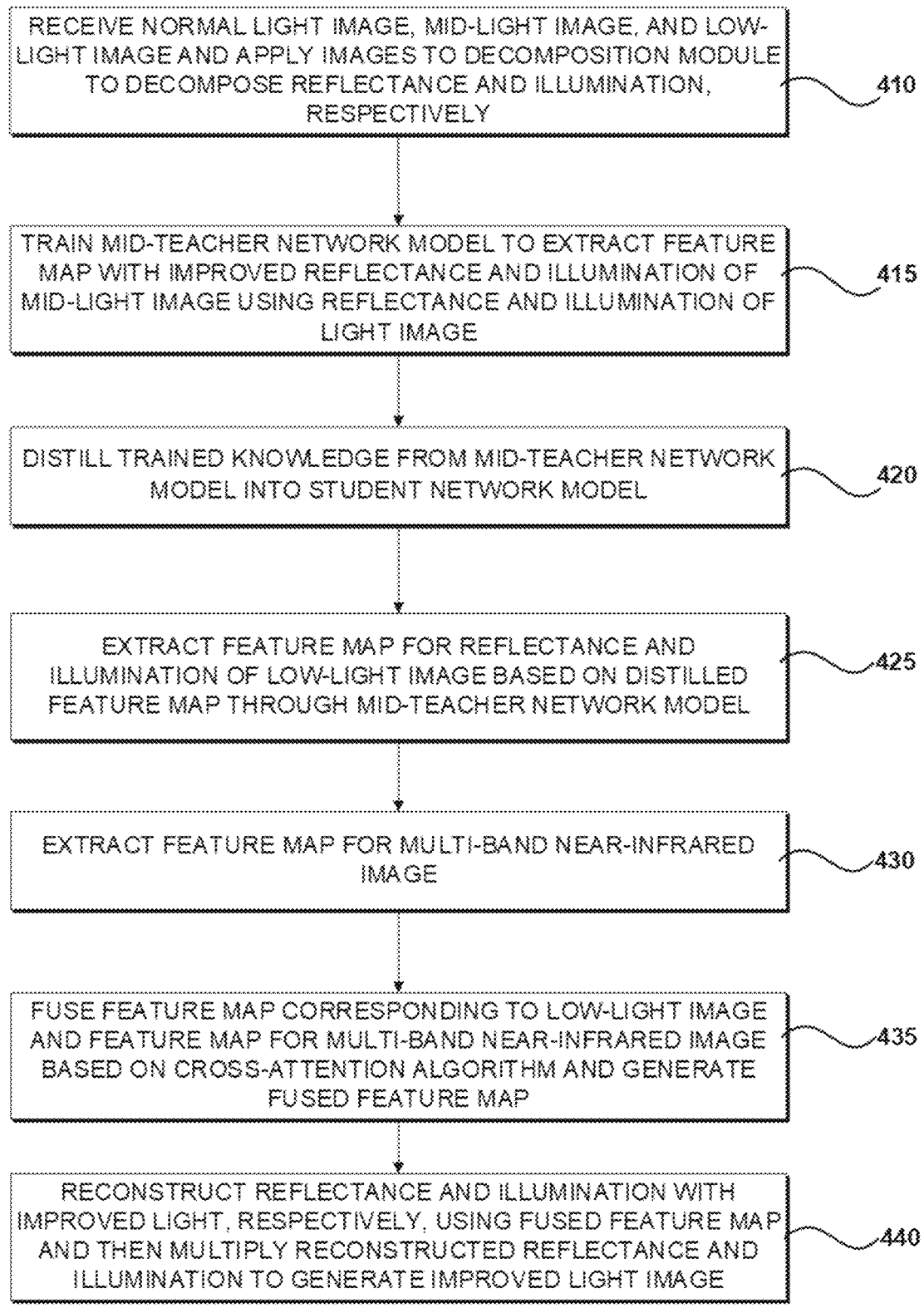
FIG. 4 is a flowchart illustrating a low-light image improvement method according to an embodiment of the present invention.

FIG. 4 is a flowchart illustrating the low-light image improvement method according to the embodiment of the present invention.

In step 410, a low-light image improvement apparatus 100 receives a normal light image, a mid-light image, and a low-light image, applies the images to a decomposition model, and decomposes the images into reflectance and illumination, respectively. The image may be composed of illumination and reflectance, and may be decomposed into the illumination and reflectance, respectively, by applying the Retinex algorithm. Since this is obvious to those skilled in the art, a detailed description thereof will be omitted.

In step 415, the low-light image improvement apparatus 100 trains the mid-teacher network model to extract a feature map with improved reflectance and illumination of the mid-light image using the reflectance and illumination of the light image.

In step 420, the low-light image improvement apparatus 100 distills the trained knowledge from the mid-teacher network model into the student network model. That is, the low-light image improvement apparatus 100 distills the feature map $F^T$ of the encoder trained in the mid-teacher network model into the first encoder of the student network model.

In step 425, the low-light image improvement apparatus 100 extracts the feature map for the reflectance and illumination of the low-light image based on the feature map $F^T$ distilled through the mid-teacher network model.

In step 430, the low-light image improvement apparatus 100 extracts the feature map for the multi-band near-infrared image.

Subsequently, in step 435, the low-light image improvement apparatus 100 fuses the feature map corresponding to the low-light image and the feature map for the multi-band near-infrared image based on the cross-attention algorithm to generate the fused feature map.

In this way, there is an advantage in that the structural features of the multi-band near-infrared image may be reflected in the low-light image by reflecting the feature map for the multi-band near-infrared image in the feature map corresponding to the low-light image.

In step 440, the low-light image improvement apparatus 100 reconstructs the reflectance and illumination with improved light, respectively, using the fused feature map, and then multiplies the reflectance and illumination to generate the final image with improved light.

Figure 5:
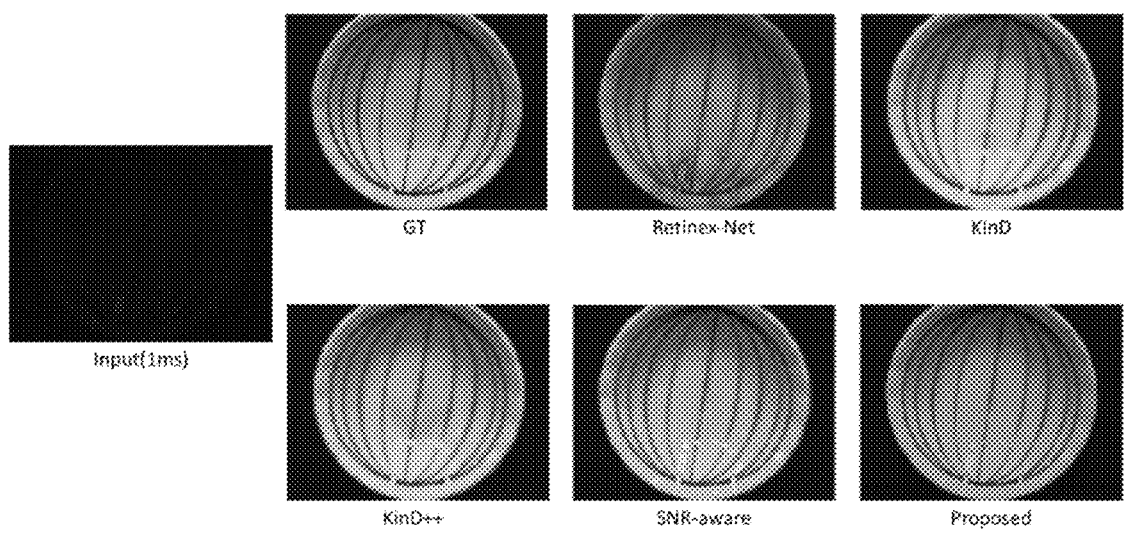
FIGS. 5 and 6 are comparison diagrams of low-light image improvement results according to the related art and an embodiment of the present invention.
Figure 6:
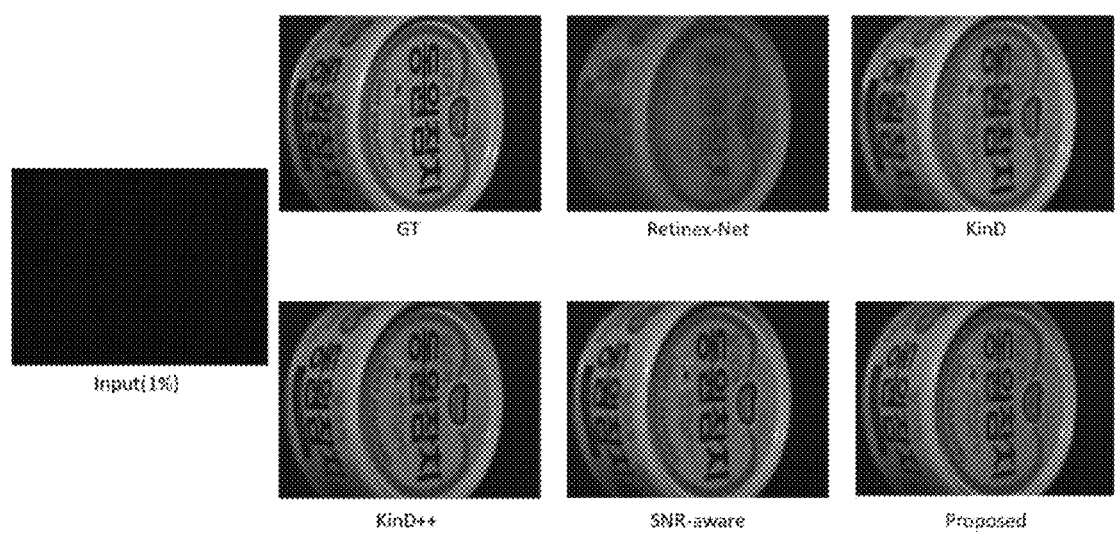

FIGS. 5 and 6 are comparison diagrams of the low-light image improvement results according to the related art and an embodiment of the present invention.

The low-light image in FIG. 5 is a low-light image generated by reducing a light exposure time, and the low-light image in FIG. 6 is a low-light image generated by reducing light intensity. It may be confirmed that the low-light image improvement method according to the embodiment of the present invention reflects and improves the structural features of the image better than the related art, and is more robust against brightness improvement and distortion than the related art.

The apparatus and the method according to the embodiment of the present invention may be implemented in a form of program commands that may be executed through various computer means and may be recorded in a computer-readable recording medium. The computer-readable recording medium may include a program command, a data file, a data structure, or the like, alone or a combination thereof. The program commands recorded in the computer-readable recording medium may be especially designed and constituted for the present invention or be known to those skilled in a field of computer software. Examples of the computer-readable recording medium may include magnetic media such as a hard disk, a floppy disk, and a magnetic tape, optical media such as a compact disk read only memory (CD-ROM) or a digital versatile disk (DVD), magneto-optical media such as a floptical disk, and a hardware device specially configured to store and execute program commands, such as a ROM, a random access memory (RAM), a flash memory, or the like. Examples of the program commands include a high-level language code capable of being executed by a computer using an interpreter, or the like, as well as a machine language code made by a compiler.

The above-mentioned hardware device may be constituted to be operated as one or more software modules in order to perform an operation according to the present invention, and vice versa.

Hereinabove, the present invention has been described with reference to exemplary embodiments thereof. It will be understood by those skilled in the art to which the present invention pertains that the present invention may be implemented in a modified form without departing from essential characteristics of the present invention. Therefore, the exemplary embodiments disclosed herein should be considered in an illustrative aspect rather than a restrictive aspect. The scope of the present invention should be defined by the claims rather than the above-mentioned description, and equivalents to the claims should be interpreted to fall within the present invention.

What is claimed is:

1. A low-light image improvement apparatus, comprising:
   an image component decomposition network module that analyzes a light image, a low-light image, and a mid-light image to decompose reflectance and illumination, respectively, wherein the mid-light image is generated using the light image and the low-light image; and
   a component improvement network module configured to include a mid-teacher network model that extracts a first feature map with improved reflectance and illumination of the mid-light image using the reflectance and illumination of the light image and a student network module that distills the extracted first feature map and then extracts a second feature map for the reflectance and illumination of the low-light image based on the distilled first feature map and acquires an image with improved light by reflecting a structural component of a multi-band near-infrared image in the second feature map.

2. The low-light image improvement apparatus of claim 1, wherein the student network model comprises:
   a first encoder configured to distill a first feature map and extract a second feature map for reflectance and illumination of the low-light image based on the distilled first feature map;
   a second encoder configured to receive the multi-band near-infrared image and extract a third feature map;
   a cross-attention transformer unit configured to fuse the third feature map in the second feature map to reflect a structural component of the multi-band near-infrared image;
   a first decoder and a second decoder configured to reconstruct the reflectance and illumination using the fused feature map, respectively; and
   a synthesizing unit configured to generate the image with improved light by multiplying the reflectance and the illumination reconstructed by the first decoder and the second decoder.

3. The low-light image improvement apparatus of claim 2, wherein the cross-attention transformer unit fuses a cross-attention map of a self-attention map for the second feature map and the third feature map.

4. The low-light image improvement apparatus of claim 2, wherein the image component decomposition network module has a separated convolutional neural network model, and the separated neural network models share weights with each other.

5. A low-light image improvement method, comprising:
   applying a light image, a low-light image, and a mid-light image to an image component decomposition network to decompose reflectance and illumination, respectively, wherein the mid-light image is generated using the light image and the low-light image;
   training the mid-teacher network model to improve the reflectance and illumination of the mid-light image using the reflectance and illumination of the light image, and then knowledge distilling an output of an encoder of the mid-teacher network model into a student network model; and
   inputting the reflectance and illumination of the low-light image to the student network model, extracting a feature map for the low-light image based on the distilled knowledge, and reflecting a structural feature of a multi-band near-infrared image in the feature map for the low-light image to generate an image with improved light.

6. The low-light image improvement method of claim 5, wherein the generating of the image with improved light comprises:
   extracting a feature map for the multi-band near-infrared image;
   generating a fused feature map by fusing the feature map of the multi-band near-infrared image with the low-light image feature map based on a cross-attention algorithm to reflect a structural component of the multi-band near-infrared image;
   reconstructing reflectance with improved light and illumination with improved light using the fused feature map; and
   generating an image with improved light by multiplying the reflectance with improved light and the illumination with improved light.

* * * * *